(12) United States Patent
Suzuki

(10) Patent No.: US 12,443,160 B2
(45) Date of Patent: Oct. 14, 2025

(54) CONTROLLER AND METHOD FOR CONTROLLING A MACHINE FOR PERFORMING TURNING OF A WORKPIECE USING A MULTI-EDGE TOOL

(71) Applicant: FANUC CORPORATION, Yamanashi (JP)

(72) Inventor: Makoto Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 389 days.

(21) Appl. No.: 18/015,410

(22) PCT Filed: Jul. 26, 2021

(86) PCT No.: PCT/JP2021/027493
§ 371 (c)(1),
(2) Date: Jan. 10, 2023

(87) PCT Pub. No.: WO2022/024974
PCT Pub. Date: Feb. 3, 2022

(65) Prior Publication Data
US 2023/0315041 A1 Oct. 5, 2023

(30) Foreign Application Priority Data

Jul. 30, 2020 (JP) .................. 2020-129216

(51) Int. Cl.
G05B 19/402 (2006.01)
G05B 19/4155 (2006.01)
G05B 19/4093 (2006.01)

(52) U.S. Cl.
CPC ....... *G05B 19/402* (2013.01); *G05B 19/4155* (2013.01)

(58) Field of Classification Search
CPC .............. G05B 19/402; G05B 19/4155; G05B 19/4061; G05B 19/40938; G16Y 10/25
See application file for complete search history.

(56) References Cited

U.S. PATENT DOCUMENTS 6,457,391 B1   10/2002   Yamazaki et al.
9,873,174 B2 *  1/2018   Asano .................... B23Q 15/26
(Continued)

FOREIGN PATENT DOCUMENTS

CN   103221167   7/2013
CN   103492109   1/2014
(Continued)

OTHER PUBLICATIONS

International Search Report issued Oct. 19, 2021 in corresponding International Application No. PCT/JP2021/027493.
(Continued)

*Primary Examiner* — Yongjia Pan
(74) *Attorney, Agent, or Firm* — Wenderoth, Lind & Ponack, L.L.P.

(57) ABSTRACT

A numerical control device comprises: a tool shape information storage/generation unit that generates and stores, as tool shape information, geometrical information relating to the shape of a multi-edge tool for turning; a machining shape information generation unit that generates machining shape information from relative movement direction information pertaining to the workpiece and the multi-edge tool and from positional relation information pertaining to the workpiece and the multi-edge tool; an edge direction determination unit that determines, from the generated tool shape information and the generated machining shape information, the edge direction of the multi-edge tool for each machining shape change point at which the machining shape changes; and a machining control unit that, on the basis of the edge direction of the multi-edge tool for each machining shape change
(Continued)

point, controls the turning while changing the edge direction of the multi-edge tool between machining shape change points.

6 Claims, 14 Drawing Sheets

(56) References Cited

U.S. PATENT DOCUMENTS

| | | | | |
|---|---|---|---|---|
| 10,180,675 | B2* | 1/2019 | Maeda | G05B 19/19 |
| 11,577,353 | B2* | 2/2023 | Yasukochi | G05B 19/40937 |
| 2009/0182451 | A1* | 7/2009 | Jennessen | G05B 19/40938 |
| | | | | 82/118 |
| 2019/0129382 | A1* | 5/2019 | Saitou | G05B 19/40938 |
| 2019/0232382 | A1* | 8/2019 | Abe | B23B 27/141 |

FOREIGN PATENT DOCUMENTS

| | | |
|---|---|---|
| CN | 110825027 | 2/2020 |
| JP | 3-109606 | 5/1991 |
| JP | 5-100723 | 4/1993 |
| JP | 2004-195563 | 7/2004 |
| JP | 2008-114309 | 5/2008 |
| JP | 2019-192103 | 10/2019 |

OTHER PUBLICATIONS

Jianxin, Y., et al., "Discussion on polygon turning simulation based on Boolean operation", Guangxi Journal of Light Industry, Issue 7, Jul. 2009, with English translation.

* cited by examiner

G42.9
N101 G00 X10.0
N102 G01 Z-10.0
N103 X14.0 Z-11.0
N104 Z-14.0
N105 X22.0 Z-17.0
N106 Z-20.0
N110 X28.0

G42.9
Gxx P101 Q110 U2.0 F0.1 S1000 T100 E1 H2
N101 G00 X10.0
N102 G01 Z-10.0
N103 X14.0 Z-11.0
N104 Z-14.0
N105 X22.0 Z-17.0
N106 Z-20.0
N110 X28.0

FIG. 11

| TOOL NUMBER | EDGE NUMBER | TOOL OFFSET AMOUNT(X) | TOOL OFFSET AMOUNT(Z) | TOOL NOSE RADIUS COMPENSATION AMOUNT(D) |
|---|---|---|---|---|
| 100 | 1 | 4.5mm | 0.0mm | 0.8mm |
|  | 2 | 5.0mm | 0.0mm | 0.4mm |
|  | 3 | 5.5mm | 0.0mm | 0.2mm |
| ... |  |  |  |  |

CONTROLLER AND METHOD FOR CONTROLLING A MACHINE FOR PERFORMING TURNING OF A WORKPIECE USING A MULTI-EDGE TOOL

TECHNICAL FIELD

The present invention relates to a numerical controller and a control method.

BACKGROUND ART

There is a multi-edge tool including a plurality of edges and capable of coping with workpieces of any shape by mounting cutting tools for different use on each of the edges and changing an approach angle.

In machining using the multi-edge tool, an edge number and offset information for each of the edges are set in advance, the edge number is selected in a machining program, a corresponding offset amount is applied from a program command point (edge rotation center), and thus the selected edge of the multi-edge tool is aligned with a cutting surface of the workpiece to be machined.

FIG. 11 is a diagram showing an example of tool information data.

FIG. 12 is a diagram showing an example of a machining program for aligning edges of a multi-edge tool with a cutting surface of a workpiece.

FIG. 13 is a diagram showing an example of a case where the multi-edge tool and the workpiece are aligned.

As shown in FIG. 11, a numerical controller includes a storage unit such as a memory that stores tool information data including, for example, a tool number such as "100" assigned to each of the registered multi-edge tools, an edge number such as "1", "2", and "3" assigned to each edge for each multi-edge tool, a tool offset amount, which is set in advance for each edge, between an X-axis direction and a Z-axis direction, and a tool nose radius compensation amount.

The numerical controller executes the machining program shown in FIG. 12 using the tool information data shown in FIG. 11 to select edge 1, and applies a corresponding offset amount (for example, the tool offset amount being 4.5 mm in the X-axis direction) from the program command point (edge rotation center) to align the edge 1 with the cutting surface of the workpiece as shown in FIG. 13.

In the machining program shown in FIG. 12, the multi-edge tool with the tool number "100" is selected and the edge 1 with the edge number "1" is selected in a sequence number "N1". Further, the tool offset amount and the tool nose radius compensation amount for the edge number "1" associated with "D99" in advance are set in a sequence number "N2", and a spindle speed is set in a sequence number "N3". In addition, a positioning angle of an edge indexing axis (hereinafter, also referred to as a "B-axis" unless otherwise specified) is set in a sequence number "N4" such that the selected edge contacts with the workpiece, and absolute positioning is performed at a machining start position in a sequence number "N5". Further, a cutting command is output in a sequence number "N6". In a sequence number "N10", the tool offset amount and the tool nose radius compensation amount for edge number "2" are validated.

Then, after aligning the edge 1 of the multi-edge tool with the cutting surface of the workpiece as described above, the numerical controller may convert the tool offset amount registered in the tool information data shown in FIG. 11 according to a change in a positioning angle of a tool rotary axis, using a method disclosed in Patent Document 1, for example, and may apply it as a new tool offset amount. Thus, even when an indexing axis (B-axis) of a multi-edge tool is tilted by a certain angle as shown in FIG. 14, the numerical controller can convert the offset amount according to the tilt angle and apply the converted offset amount.

Alternatively, as shown in FIG. 15, the numerical controller may control edges to move along the commanded path by performing a tool length offset every moment even in the middle of a block according to a change in a positioning angle of a tool rotary axis, using a method disclosed in Patent Document 2.

FIG. 14 is a diagram showing an example of the method disclosed in Patent Document 1. FIG. 15 is a diagram showing an example of the method disclosed in Patent Document 2.

Patent Document 1: Japanese Unexamined Patent Application, Publication No. H3-109606
Patent Document 2: Japanese Unexamined Patent Application, Publication No. H5-100723

DISCLOSURE OF THE INVENTION

Problems to be Solved by the Invention

By the way, when the machining is performed using the multi-edge tool for turning having a plurality of edges as shown in FIG. 13, the numerical controller does need to perform appropriate positioning to align the selected edge with the cutting surface of the workpiece using the edge indexing axis (B-axis) command in a case of selecting a tool number and an edge number to be used with a T command and an E command and exchanging the tool.

Further, even when the positioning of the B-axis is appropriately performed once, the numerical controller may need to perform the positioning of the B-axis again such that the selected edge is aligned with the cutting surface of the workpiece according to a change of a direction perpendicular to the cutting surface on an XZ plane.

FIG. 16 is a diagram showing an example of cutting in which the direction perpendicular to the cutting surface on the XZ plane changes. An upper part in FIG. 16 shows a shape of the entire workpiece, and a lower part in FIG. 16 shows an XZ plane section of the workpiece at a rectangular portion indicated by a broken line in the upper part in FIG. 16.

As shown in the upper part in FIG. 16, the workpiece has, for example, a cylinder W1 and a cylinder W2 having a larger radius than the cylinder W1. When the multi-edge tool cuts a side surface of the cylinder W1 of the workpiece, an edge direction of edge 1 of the multi-edge tool is an X-axis direction which is a direction perpendicular to the cutting surface of the side surface of the cylinder W1. On the other hand, when the multi-edge tool cuts an upper surface of the cylinder W2 of the workpiece, an edge direction of edge 1 of the multi-edge tool is a Z-axis direction which is a direction perpendicular to the cutting surface of the upper surface of the cylinder W2. In other words, when a tool path for cutting advances from the cylinder W1 to the upper surface of the cylinder W2, the numerical controller needs to perform positioning of the B-axis to change the edge direction of the edge 1 of the multi-edge tool as shown in the upper part in FIG. 16.

However, a machining geometry of the workpiece is complicated as shown in FIG. 16, it is difficult for a user to create a positioning command program of the B-axis while avoiding interference between the cutting surface and the tool according to the change in the direction perpendicular to the cutting surface. In such machining, the user needs to create a program using a CAM (Computer Aided Manufacturing).

Therefore, it is desirable to easily perform positioning of the edge indexing axis such that the selected edge always contacts with the cutting surface while avoiding the interference between the workpiece and the tool.

Means for Solving the Problems

An aspect of the present disclosure is to provide a numerical controller that controls a machine tool for performing turning of a workpiece using a multi-edge tool for turning, the numerical controller including: a tool geometry information storage/generation unit configured to generate and store, as tool geometry information, geometrical information related to a shape of the multi-edge tool; a machining geometry information generation unit configured to generate machining geometry information related to a shape of the turning, based on relative movement direction information between the multi-edge tool and the workpiece to be commanded by a machining program for the turning and positional relationship information between the multi-edge tool and the workpiece; an edge direction determination unit configured to determine, based on the generated tool geometry information and the generated machining geometry information, an edge direction of the multi-edge tool for each of machining geometry change points at which a machining geometry changes; and a machining control unit configured to, based on the edge direction of the multi-edge tool for each of the machining geometry change points, control the turning while changing the edge direction of the multi-edge tool between the machining geometry change points.

An aspect of the present disclosure is to provide a control method for a machine tool to be implemented by a computer, the machine tool being for performing turning of a workpiece using a multi-edge tool for turning, the control method including: generating and storing, as tool geometry information, geometrical information related to a shape of the multi-edge tool; generating machining geometry information related to a shape of the turning, based on relative movement direction information between the multi-edge tool and the workpiece to be commanded by a machining program for the turning and positional relationship information between the multi-edge tool and the workpiece; determining, based on the generated tool geometry information and the generated machining geometry information, an edge direction of the multi-edge tool for each of machining geometry change points at which a machining geometry changes; and controlling, based on the edge direction of the multi-edge tool for each of the machining geometry change points, the turning while changing the edge direction of the multi-edge tool between the machining geometry change points.

Effects of the Invention

According to the aspects, it is possible to easily perform positioning of the edge indexing axis such that the selected edge always contacts with the cutting surface while avoiding the interference between the workpiece and the tool.

BRIEF DESCRIPTION OF THE DRAWINGS

FIG. 11 is a diagram showing an example of tool information data;

FIG. 12 is a diagram showing an example of a machining program for aligning edges of a multi-edge tool with a cutting surface of a workpiece;

PREFERRED MODE FOR CARRYING OUT THE INVENTION

Embodiment

First, the present embodiment will be schematically described. In the present embodiment, a numerical controller decodes a command of a machining program, and acquires relative movement direction information between a multi-edge tool and a workpiece and positional relationship information between the multi-edge tool and the workpiece, based on the decoded command of the machining program.

The numerical controller generates machining geometry information on a shape for turning using the acquired relative movement direction information and positional relationship information. The numerical controller determines, based on the tool geometry information related to the shape of the multi-edge tool and the generated machining geometry information, an edge direction of the multi-edge tool for each machining geometry change point at which a machining geometry changes, and controls the turning while changing the edge direction of the multi-edge tool in a tool path between the machining geometry change points, based on the edge direction of the multi-edge tool for each machining geometry change point.

Thus, according to the present embodiment, it is possible to solve a problem of "easily positioning a B-axis such that a selected edge always contacts a cutting surface while avoiding interference between the cutting surface and a tool".

The above is the outline of the present embodiment.

Next, a configuration of the present embodiment will be described in detail with reference to the drawings.

Figure 1:
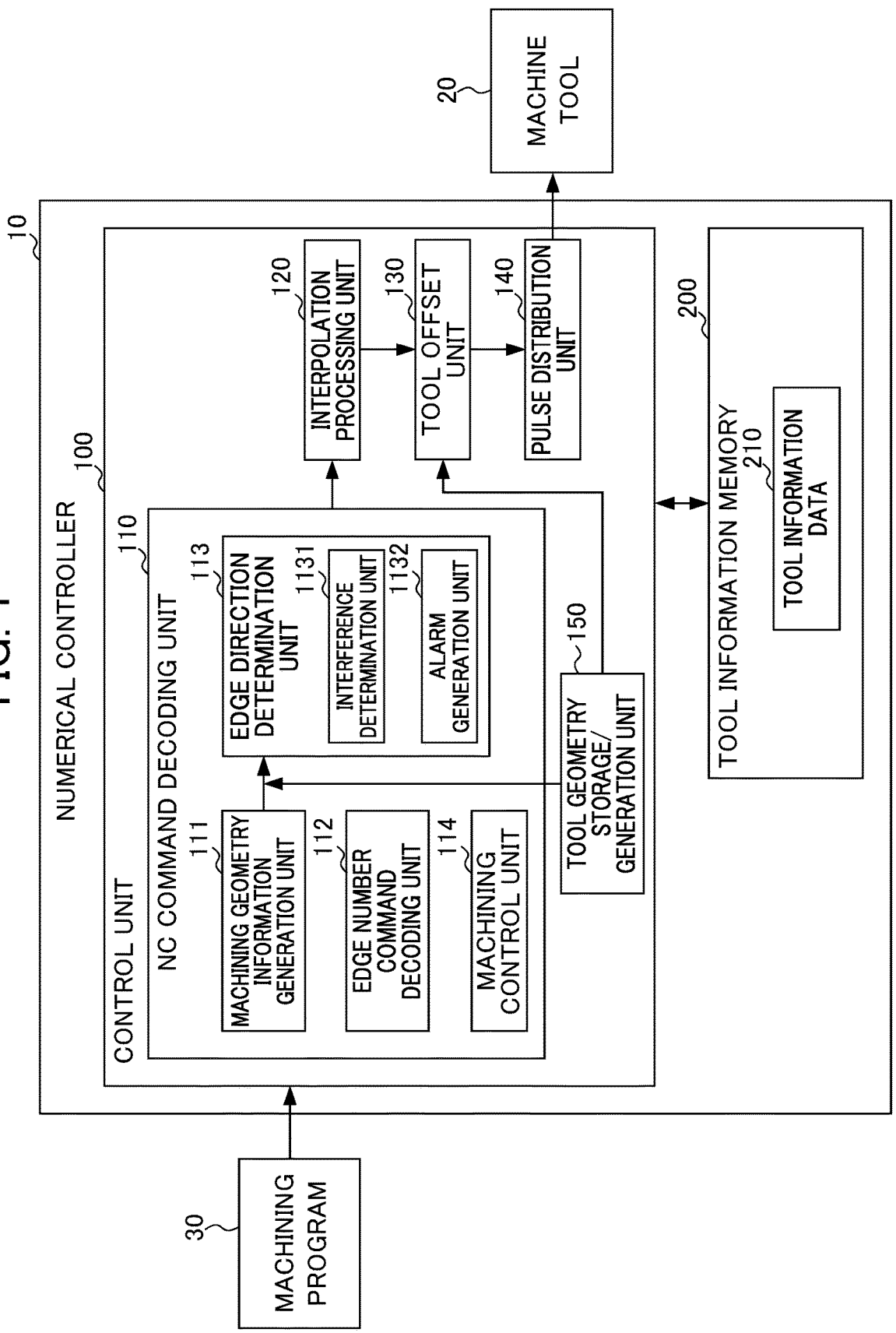
FIG. 1 is a functional block diagram showing a functional configuration example of a numerical controller according to an embodiment.

FIG. 1 is a functional block diagram showing a configuration example of a numerical controller according to the embodiment.

A numerical controller 10 and a machine tool 20 may be directly connected to each other via a connection interface (not shown). The numerical controller 10 and the machine tool 20 may be connected to each other via a network such as an LAN (Local Area Network) or the Internet. In this case, the numerical controller 10 and the machine tool 20 include a communication unit (not shown) configured to perform mutual communication through such connection.

The machine tool 20 is, for example, a lathe for turning known to those skilled in the art, and operates based on an operation command from the numerical controller 10, which will be described below.

The numerical controller 10 is a numerical controller known to those skilled in the art, generates an operation command based on control information, and transmits the generated operation command to the machine tool 20. Thus, the numerical controller 10 controls the operation of the machine tool 20.

As shown in FIG. 1, the numerical controller 10 includes a control unit 100 and a tool information memory 200.

Furthermore, the control unit 100 includes an NC command decoding unit 110, an interpolation processing unit 120, a tool offset unit 130, a pulse distribution unit 140, and a tool geometry storage/generation unit 150. Furthermore, the NC command decoding unit 110 includes a machining geometry information generation unit 111, an edge number command decoding unit 112, an edge direction determination unit 113, and a machining control unit 114. Further, the edge direction determination unit 113 includes an interference determination unit 1131 and an alarm generation unit 1132.

<Tool Information Memory 200>

The tool information memory 200 is a storage unit such as SSD (Solid State Drive) or HDD (Hard Disk Drive). The tool information memory 200 stores tool information data 210.

The tool information data 210 includes, for example, tool information and edge information regarding a multi-edge tool selectable for the machine tool 20. Further, the tool information data 210 secures a zone capable of storing information for each edge by registering edge numbers corresponding to the number of edges for each multi-edge tool.

Figure 2:
FIG. 2 is a diagram showing an example of tool information data.

FIG. 2 is a diagram showing an example of the tool information data 210.

As shown in FIG. 2, the tool information data 210 includes a storage zone for storing a tool number assigned to each multi-edge tool to be registered, an edge number assigned to each edge for each multi-edge tool, an inter-edge angle, and an edge length, for example.

The tool information data 210 may include a storage zone for storing a tool offset amount for each multi-edge tool and a tool nose radius compensation amount.

The tool information data 210 may store tool numbers, for example, "100", "102", and "103" assigned to respective multi-edge tools, as described above.

Further, the tool information data 210 stores edge numbers "1" to "3" which are assigned to the multi-edge tool with the tool number "100". This indicates that the multi-edge tool with the tool number "100" has three edges. On the other hand, the tool information data 210 stores edge numbers "1" to "4" which are assigned to each of the multi-edge tool with the tool number "102" and the multi-edge tool with the tool number "103". This indicates that each of the multi-edge tools with the tool numbers "102" and "103" has four edges.

Figure 3A:
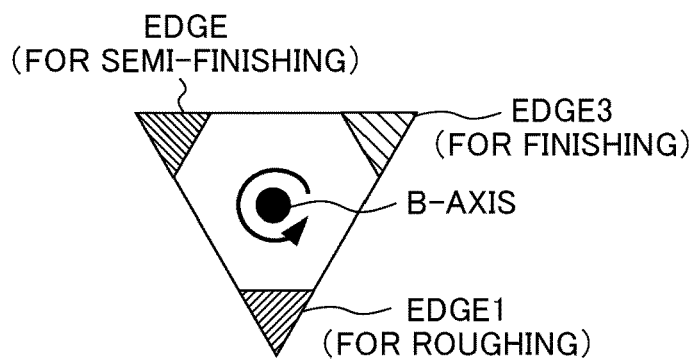
FIG. 3A is a diagram showing an example of a multi-edge tool.
Figure 3B:
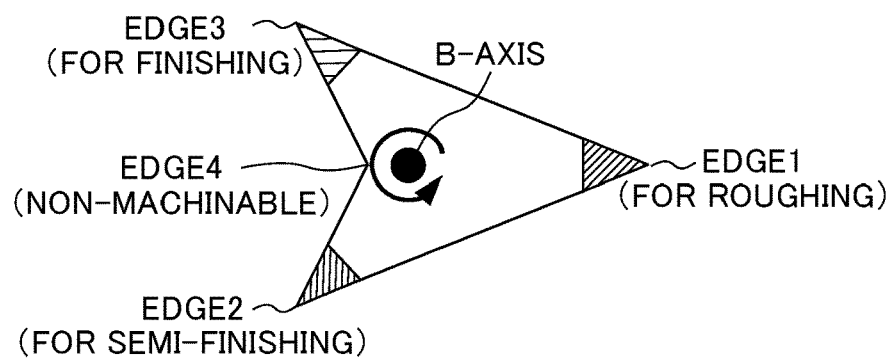
FIG. 3B is a diagram showing an example of a multi-edge tool.
Figure 3C:
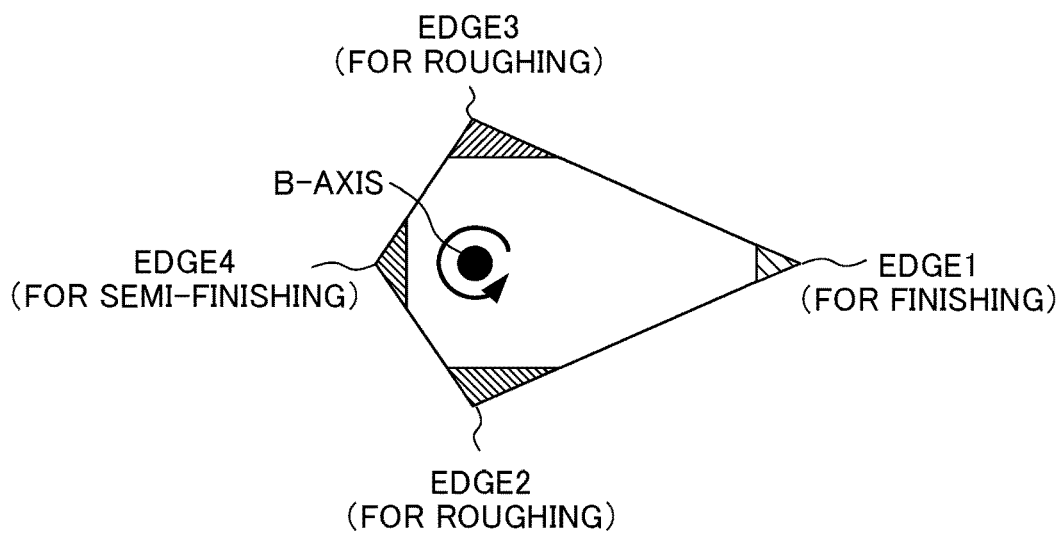
FIG. 3C is a diagram showing an example of a multi-edge tool.

FIGS. 3A to 3C are diagrams showing examples of multi-edge tools.

FIG. 3A shows a multi-edge tool with a tool number "100". The multi-edge tool with the tool number "100" has an edge for roughing at edge number "1", an edge for semi-finishing at edge number "2", and an edge for finishing at edge number "3". Thus, the multi-edge tool in FIG. 3A can continuously perform roughing, semi-finishing, and finishing by rotating a B-axis (around a Y-axis). Then, the tool information data 210 stores inter-edge angles of "0", "$\alpha_{E2}$", and "$\alpha_{E3}$" and edge lengths of "$L1_{E1}$", "$L1_{E2}$", and "$L1_{E3}$" for the edge numbers "1" to "3" in advance.

For example, when a straight line connecting the rotation center (B-axis) of the multi-edge tool and the tip of edge 1 of edge number 1 is a used as a reference, the inter-edge angle indicates an angle with a straight line connecting the rotation center (B-axis) of the multi-edge tool and a tip of another edge (for example, edge 2 (E2) or edge 3 (E3)), for example, a clockwise angle. For this reason, an inter-edge angle of edge 1 (E1) is 0 degree.

Further, the edge length is a distance from the rotation center (B-axis) of the multi-edge tool to the tip of each of the edge 1 (E1) to the edge 3 (E3).

FIG. 3B shows a multi-edge tool with a tool number "102". The multi-edge tool with the tool number "102" has an edge for roughing at edge number "1", an edge for semi-finishing at edge number "2", and an edge for finishing at edge number "3". Thus, the multi-edge tool can continuously perform roughing, semi-finishing, and finishing by rotating a B-axis (around a Y-axis). Edge number "4" is an edge that is a recessed portion and cannot be used for cutting, as shown in FIG. 3B.

Then, the tool information data 210 stores inter-edge angles of "0", "$\Theta_{E2}$", "$\Theta_{E3}$", and "$\Theta_{E4}$" and edge lengths of "$L2_{E1}$", "$L2_{E2}$", "$L2_{E3}$", and "$L2_{E4}$" for the edge numbers "1" to "4" in advance.

FIG. 3C shows a multi-edge tool with a tool number "103". The multi-edge tool with the tool number "103" has an edge for finishing at edge number "1", an edge for roughing at edge number "2", an edge for roughing at edge number "3", and an edge for semi-finishing at edge number "4". Thus, the multi-edge tool can continuously perform roughing, semi-finishing, and finishing by rotating a B-axis (around a Y-axis). Then, the tool information data 210 stores inter-edge angles of "0", "$\gamma_{E2}$", "$\gamma_{E3}$", and "$\gamma_{E4}$" and edge lengths of "$L3_{E1}$", "$L3_{E2}$", "$L3_{E3}$", and "$L3_{E4}$" for the edge numbers "1" to "4" in advance.

<Control Unit 100>

The control unit 100 includes, for example, a CPU, a ROM, a RAM, and a CMOS memory which are configured to communicate with each other via a bus, as known to those skilled in the art.

The CPU is a processor that controls the numerical controller 10 as a whole. The CPU reads, via the bus, a system program and an application program stored in the ROM, and controls the numerical controller 10 as a whole according to the system program and the application program. Thus, as shown in FIG. 1, the control unit 100 is configured to realize functions of the NC command decoding unit 110, the interpolation processing unit 120, the tool offset unit 130, the pulse distribution unit 140, and the tool geometry storage/generation unit 150. Further, the NC command decoding unit 110 is configured to realize functions of the machining geometry information generation unit 111, the edge number command decoding unit 112, the edge direction determination unit 113, and the machining control unit 114. Further, the edge direction determination unit 113 is configured to realize functions of the interference determination unit 1131 and the alarm generation unit 1132. The RAM stores various data, for example, temporary calculation data and display data. The CMOS memory is backed up by a battery (not shown) and is configured as a nonvolatile memory that retains a memory state even when the numerical controller 10 is powered off. Next, the control unit 100 will be described. First, the tool geometry storage/generation unit 150 will be described.

<Tool Geometry Storage/Generation Unit 150>

The tool geometry storage/generation unit 150 generates and stores, as tool geometry information, geometrical information relating to a shape of a multi-edge tool corresponding to the multi-edge tool to be commanded by a machining program 30 decoded by the edge number command decoding unit 112 which will be described below, based on the tool information data 210 registered in the tool information memory 200.

Specifically, for each multi-edge tool to be command by the machining program 30, the tool geometry storage/generation unit 150 generates the tool geometry information of the multi-edge tool, based on the tool information data 210, by (a) calculating a vector $V_{ENEM}$ from each edge tip to another edge tip, (b) attaching a non-machinable flag to an edge that cannot perform machining, and (c) calculating an indexing angle ($\beta_{EN}$) for centering a tip angle of each edge (that is, a bisector of the tip angle coincides with an X-axis direction). Note that N and M are integers of 1 or more, and N≠M.

Figure 4A:
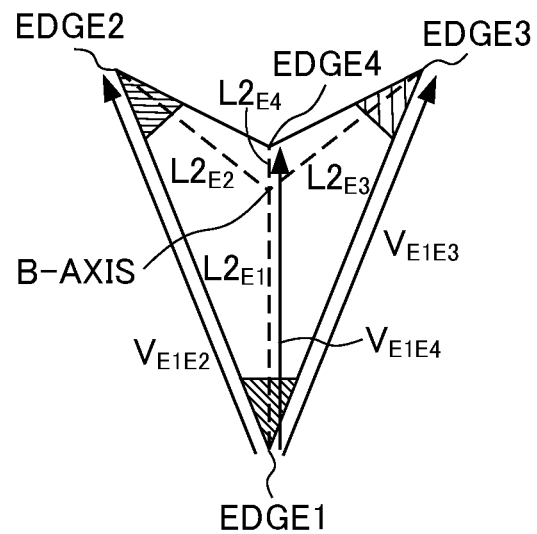
FIG. 4A is a diagram showing an example of a vector $V_{ENEM}$ from an edge tip of edge 1 to another edge tip in the case of the multi-edge tool shown in FIG. 3B.
Figure 4B:
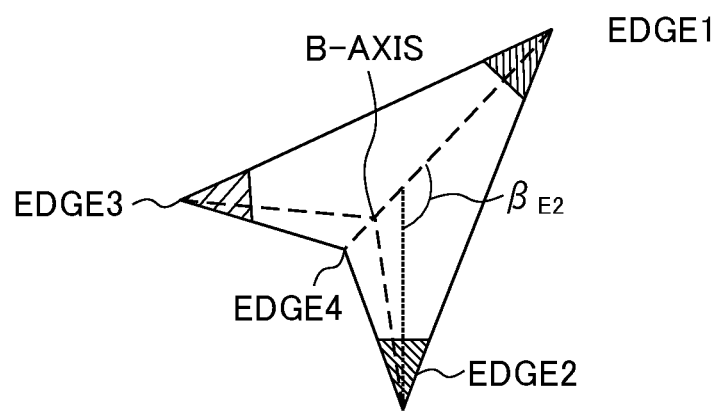
FIG. 4B is a diagram showing an example of an indexing angle $\beta_{E2}$ for centering a tip angle of edge 2 in the case of the multi-edge tool shown in FIG. 3B.

FIG. 4A is a diagram showing an example of a vector $V_{ENEM}$ from an edge tip of edge 1 to another edge tip in the case of the multi-edge tool shown in FIG. 3B. FIG. 4B is a diagram showing an example of an indexing angle $\beta_{E2}$ for centering a tip angle of edge 2 in the case of the multi-edge tool shown in FIG. 3B.

As shown in FIG. 4A, the tool geometry storage/generation unit 150 calculates vectors $V_{E1E2}$, $V_{E1E3}$, and $V_{E1E4}$ from an edge tip of edge 1 (E1) to tips of edges different from the edge tip, that is, edge 2 (E2), edge 3 (E3), and edge 4 (E4). The tool geometry storage/generation unit 150 may calculate a vector $V_{ENEM}$ from the edge tip of each of edge 2 (E2), edge 3 (E3), and edge 4 (E4) to tips of other edges, as in the case of the vectors $V_{E1E2}$, $V_{E1E3}$, and $V_{E1E4}$.

Further, as described above, since edge 4 of the multi-edge tool in FIG. 3B is recessed and cannot be used for cutting, the tool geometry storage/generation unit 150 attaches a non-machinable flag to edge 4.

Further, as shown in FIG. 4B, the tool geometry storage/generation unit 150 calculates an indexing angle $\beta_{E2}$ for centering a tip angle of edge 2, based on edge 1 (E1), for example. The tool geometry storage/generation unit 150 may also calculate an indexing angle $\beta_{E3}$ for centering a tip angle of edge 3 (E3), as in the case of edge 2 (E2).

The tool geometry storage/generation unit 150 outputs the generated tool geometry information to the NC command decoding unit 110 and the tool offset unit 130 which will be described below.

The tool geometry storage/generation unit 150 may generate tool geometry information for each tool information data 210 registered in advance in the tool information memory 200 (related to a multi-edge tool), and store the generated tool geometry information of the multi-edge tool in the tool information memory 200.

<NC Command Decoding Unit 110>

The NC command decoding unit 110 acquires a machining program 30 generated by an external device such as a CAD/CAM device, and analyzes the acquired machining program 30.

The machining program 30 includes a program in which a tool path for machining by the multi-edge tool is specified and a program in which the tool path for machining by the multi-edge tool is not specified. In the following description, a description will be given with respect to (1) a case of the machining program 30 in which the tool path for machining by the multi-edge tool is specified and (2) a case of the machining program 30 in which the tool path for machining by the multi-edge tool is not specified.

Figures 5A, 5B:
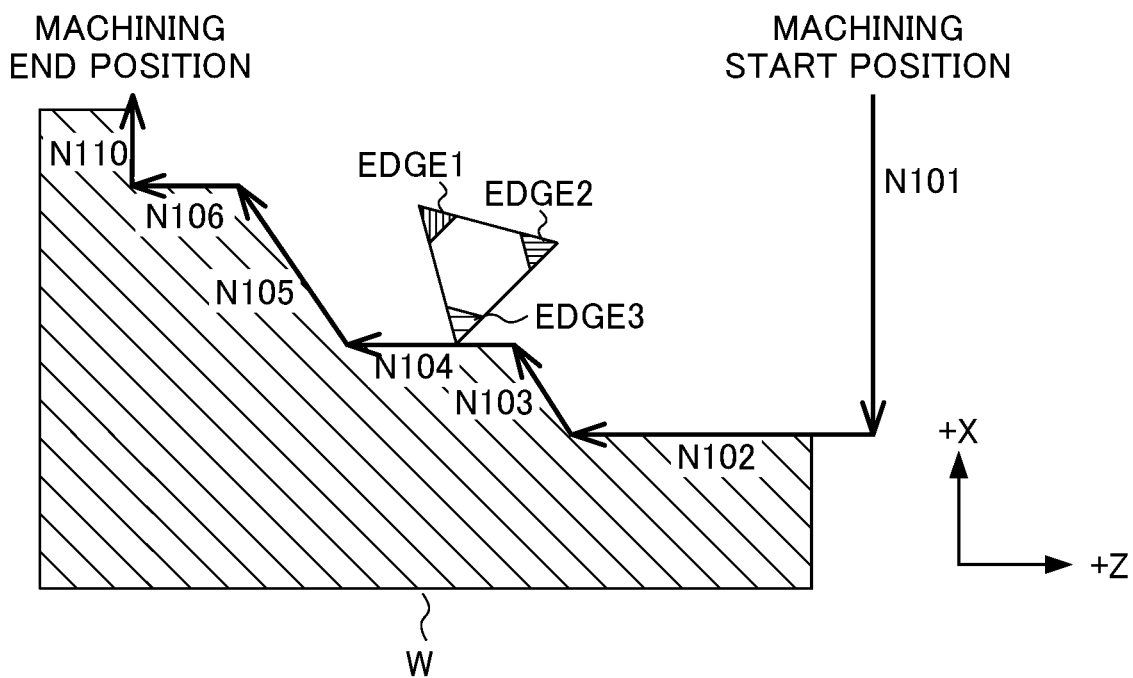
FIG. 5A is a diagram showing an example of a machining program in which a tool path for machining by the multi-edge tool is specified.
FIG. 5B is a diagram showing an example of a finished shape of a workpiece cut by the machining program shown in FIG. 5A.

(1) Case of Machining Program 30 in which Tool Path for Machining by Multi-Edge Tool is Specified FIG. 5A is a diagram showing an example of a machining program 30 in which a tool path for machining by the multi-edge tool is specified. FIG. 5B is a diagram showing an example of a finished shape of a workpiece W cut by the machining program 30 shown in FIG. 5A.

As shown in FIG. 5B, the NC command decoding unit 110 analyzes that finishing is to be performed using tool paths in order from sequence number "N101" to sequence number "N110", for example. In other words, the tool path shown in FIG. 5B is a path according to command values of the machining program 30 in FIG. 5A.

Here, "G42.9" in a first block of the machining program 30 in FIG. 5A executes an automatic determination mode for edge direction, and the multi-edge tool passes through a right side in a moving direction on the tool path in FIG. 5B. When the first block of the machining program 30 in FIG. 5A is "G41.9", the multi-edge tool passes through a left side in the moving direction on the tool path in FIG. 5B. In other words, the "G41.9" and the "G42.9" are examples of positional relationship information between the multi-edge tool and the workpiece W.

Figures 6A, 6B:
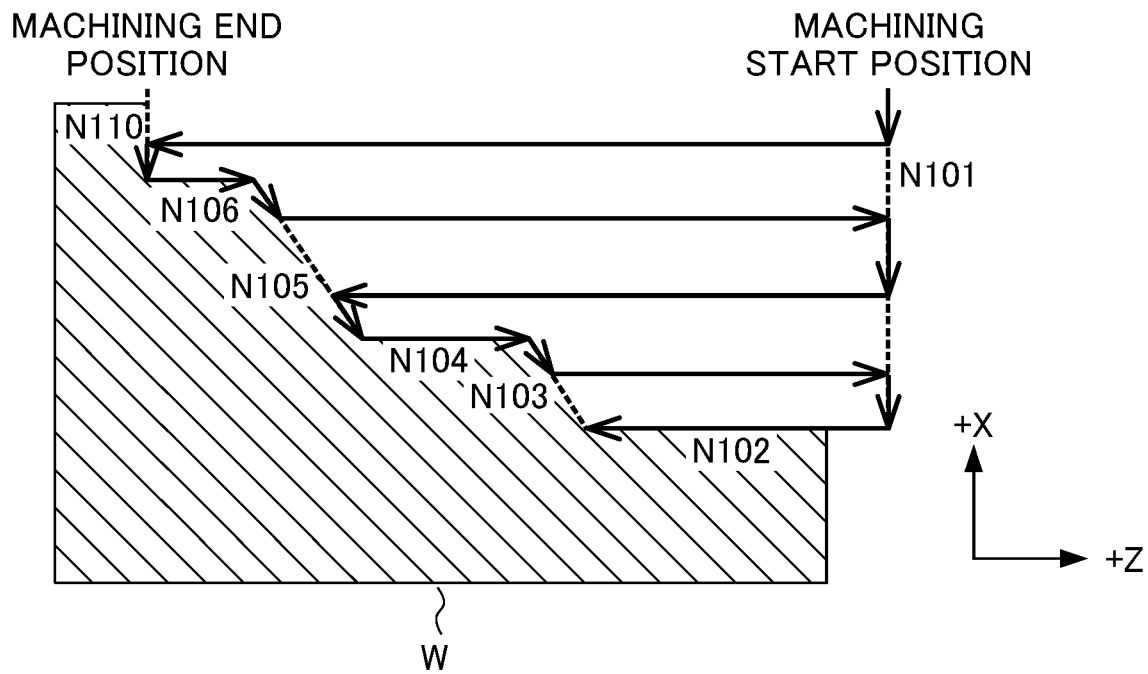
FIG. 6A is a diagram showing an example of a machining program in which a tool path for machining by the multi-edge tool is not specified.
FIG. 6B is a diagram showing an example of a tool path of a workpiece W cut by the machining program shown in FIG. 6A.

(2) Case of Machining Program 30 in which Tool Path for Machining by Multi-Edge Tool is not Specified FIG. 6A is a diagram showing an example of the machining program 30 in which the tool path for machining by the multi-edge tool is not specified. FIG. 6B is a diagram showing an example of a tool path of the workpiece W cut by the machining program 30 in FIG. 6A. A broken line shown in FIG. 6B indicates the finished shape of the workpiece W, as in FIG. 5B.

As shown in FIG. 6A, the machining program 30 is a program having 15 blocks. "Gxx" in a second block is a simplified program command, and is a main program for cutting the workpiece W into the finished shape indicated by the broken line in FIG. 6B.

Argument "P101" of "Gxx" indicates a sequence number of a first block that determines the finished shape. Further, argument "Q110" of "Gxx" indicates a sequence number of a last block that determines the finished shape. Sequence numbers "101" to "110" of the machining program 30 in FIG. 6A are the same as those of the machining program 30 in FIG. 5A.

In addition, argument "U2.0" of "Gxx" indicates the amount of cutting of the tool. Further, argument "F0.1" of "Gxx" indicates a feed rate of the tool. Further, argument "S1000" of "Gxx" indicates a spindle speed per minute. Further, argument "T100" of "Gxx" indicates a tool number. In addition, argument "E1" of "Gxx" indicates an edge number for a forward path which will be described below. Further, argument "H2" of "Gxx" indicates an edge number for a return path which will be described below.

The NC command decoding unit 110 pre-reads a plurality of blocks included in the machining program 30 in FIG. 6A, and calculates tool paths of the multi-edge tool from NC commands in the plurality of pre-read blocks.

Specifically, the NC command decoding unit 110 calculates a path of the finished shape indicated by the broken line in FIG. 6B from the NC command of each of the plurality of blocks of the machining program 30 in FIG. 6A, for example. However, since the amount of cutting of the multi-edge tool is limited, it is not possible to cut along the finished shape indicated by the broken line in FIG. 6B from the beginning. Therefore, the NC command decoding unit 110 calculates the tool path, which allows the multi-edge tool to cut within the amount of cutting, shown in FIG. 6B, based on the NC command of each of the plurality of blocks of the machining program 30 in FIG. 6A.

In other words, as shown in FIGS. 6A and 6B, the NC command decoding unit 110 calculates the tool path on which the tool reciprocates in a Z-axis direction to cut the workpiece W with the amount of cutting set in −X-axis direction.

In other words, the tool path shown in FIG. 6B is not a path according to the command values of the machining program 30 in FIG. 6A, but a path generated inside the numerical controller 10.

Here, the direction in which the multi-edge tool moves along the workpiece W (the Z-axis direction in FIG. 6B) is also referred to as a "reciprocating axis". Further, the direction when viewed from a machining start position to a machining end position based on the reciprocating axis (the −Z-axis direction in FIG. 6B) is also referred to as a "forward path direction". Further, the direction when viewed from the machining end position to the machining start position based on the reciprocating axis (the +Z-axis direction in FIG. 6B) is also referred to as a "return path direction".

<Machining Geometry Information Generation Unit 111>

The machining geometry information generation unit 111 generates machining geometry information related to the shape of the turning based on relative movement direction information, which is commanded by the machining program 30 for turning, between the multi-edge tool and the workpiece and positional relationship information between the multi-edge tool and the workpiece.

Specifically, the machining geometry information generation unit 111 reads an edge movement direction command (X_Z_) in an automatic determination mode for edge direction (G41.9/G42.9), and stores it as a position vector of the tip of the multi-edge tool.

The machining geometry information generation unit 111 stores all movement commands for moving on the tool path (or the finished shape indicated by the broken line in FIG. 6B) in FIG. 5B as position vectors (machining geometry information).

The machining geometry information generation unit 111 may store the position vector (machining geometry information), not only for direct G00/G01/G02/G03 commands but also for commands that internally operate with G00/G01/G02/G03 such as canned cycles. Further, the machining geometry information generation unit 111 may read blocks until an edge indexing axis positioning mode cancel (G40) is read.

<Edge Number Command Decoding Unit 112>

The edge number command decoding unit 112 decodes, for example, the edge number command in the machining program 30, and outputs the commanded edge number to the edge direction determination unit 113 which will be described below.

<Edge Direction Determination Unit 113>

As described above, the edge direction determination unit 113 determines an edge direction of the multi-edge tool for each machining geometry change point at which a machining geometry changes, based on the tool geometry information generated by the tool geometry storage/generation unit 150 and the machining geometry information generated by the machining geometry information generation unit 111 with respect to the commanded edge number. In the following description, an edge direction of edge 1 of a multi-edge tool 40 is exemplified, but edge directions of other edges including edge 2 are the same.

Figure 7:
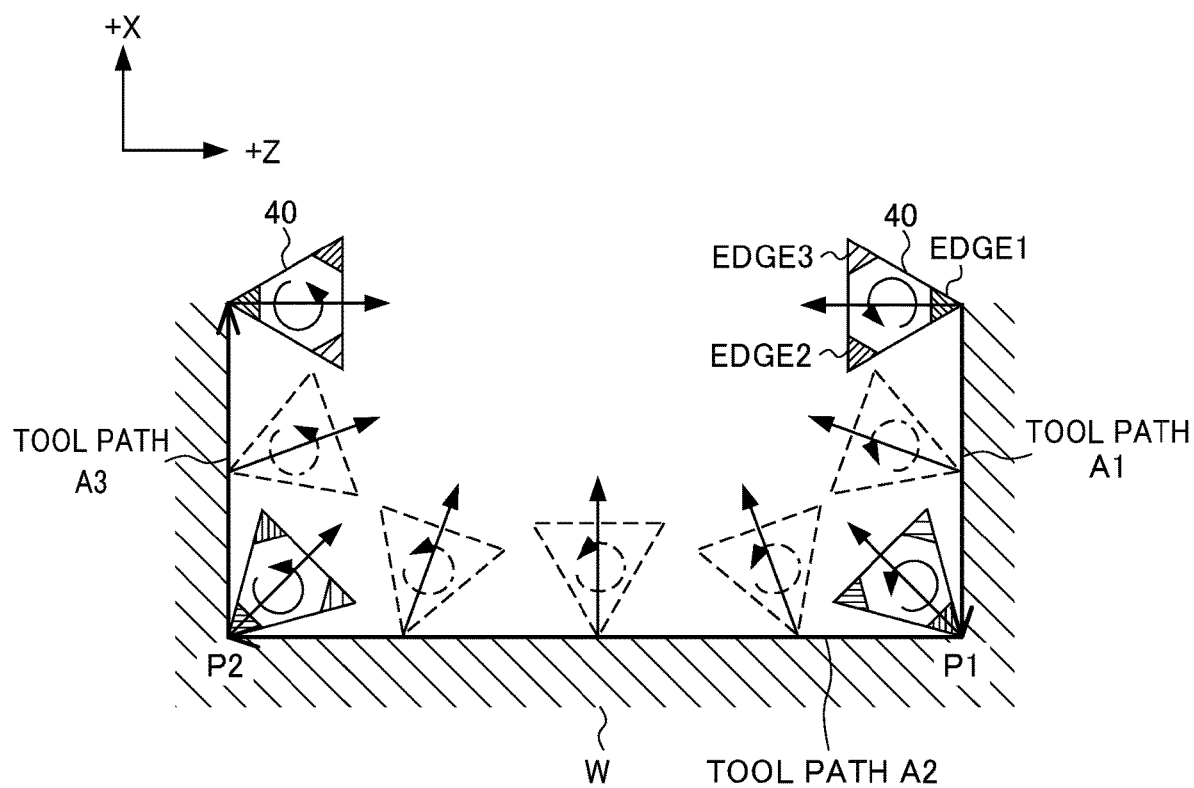
FIG. 7 is a diagram showing an example of a machining geometry based on machining geometry information.

FIG. 7 is a diagram showing an example of a machining geometry based on machining geometry information.

As shown in FIG. 7, for example, tool paths A1 to A3 are calculated by the NC command decoding unit 110, and the tool paths A1 to A3 are paths along which the multi-edge tool 40 cuts the workpiece W in order.

The edge direction determination unit 113 determines edge directions, for example, not only in a start point of the tool path A1 and an end point of the tool path A3 but also in a point (hereinafter, also referred to as a "machining geometry change point") P1 at which the tool path A1 switches to the tool path A2 and a machining geometry change point P2 at which the tool path A2 switches to the tool path A3.

Specifically, the edge direction determination unit 113 determines an edge direction such that a bisector (for example, a direction with 45 degrees to an upper left) of an angle (for example, 90 degrees) formed by the tool path A1 and the tool path A2 at the machining geometry change point P1 coincides with a center of an edge tip angle of edge 1 of the multi-edge tool 40. Further, the edge direction determination unit 113 determines an edge direction such that a bisector (for example, a direction with 45 degrees to an upper right) of an angle (for example, 90 degrees) formed by the tool path A2 and the tool path A3 at the machining geometry change point P2 coincides with the center of the edge tip angle of edge 1 of the multi-edge tool 40.

The edge direction determination unit 113 determines an edge direction such that a direction (that is, a −Z-axis direction) perpendicular to the cutting surface of the tool path A1 at the start point of the tool path A1 coincides with the center of the edge tip angle of edge 1 of the multi-edge tool 40. Further, the edge direction determination unit 113 determines an edge direction such that a direction (that is, a +Z-axis direction) perpendicular to the cutting surface of the tool path A3 at the end point of the tool path A3 coincides with the center of the edge tip angle of edge 1 of the multi-edge tool 40.

Thus, the interpolation processing unit 120, which will be described below, can interpolate, by a known interpolation process, positioning angles of edge indexing axes in the tool path A1 from the start point of the tool path A1 to the machining geometry change point P1, the tool path A2 from the machining geometry change point P1 to the machining geometry change point P2, and the tool path A3 from the machining geometry change point P2 to the end point of the tool path A3, using edge directions, that is, positioning angles of edge indexing axes at the start point of the tool path A1, the end point of the tool path A3, and the machining geometry change points P1 and P2. Thus, the user does not have to command the positioning angle of the edge indexing axis in the machining program 30, and the burden on the user can be reduced.

When the angle between the tool paths (blocks) is less than 180 degrees, the edge direction determination unit 113 may determine, as the edge direction (the positioning angle of the edge indexing axis), an angle at which a center line of an angle of the tool path (block) and a center line of the edge tip point of the multi-edge tool 40 coincide with each other.

Figure 8A:
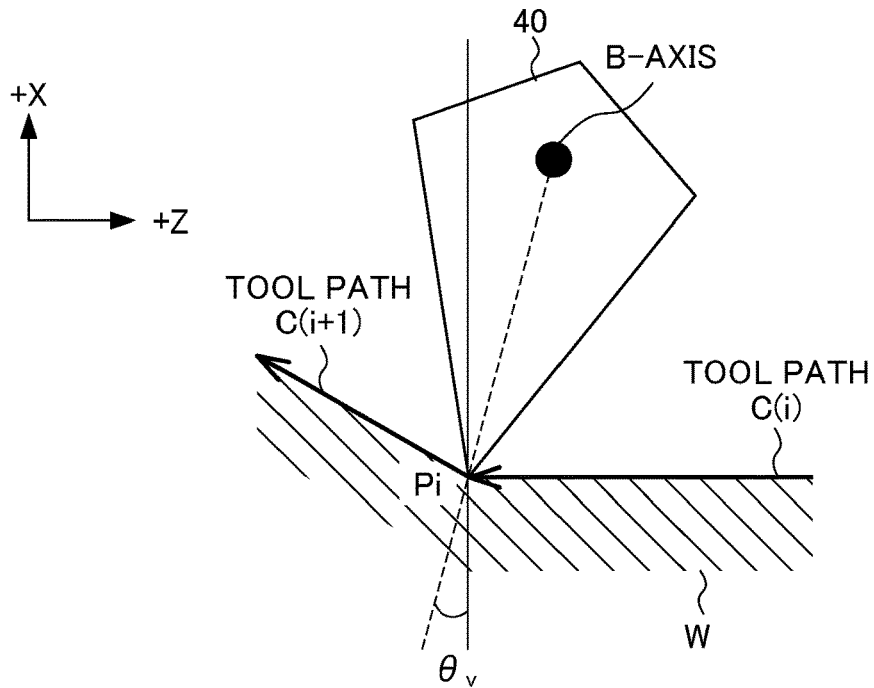
FIG. 8A is a diagram showing an example of a case where an angle between tool paths is less than 180 degrees.

FIG. 8A is a diagram showing an example of a case where an angle between tool paths is less than 180 degrees.

As shown in FIG. 8A, similarly to the case of FIG. 7, the edge direction determination unit 113 determines an edge direction such that a bisector of an angle formed by a tool path C(i) and a tool path C(i+1) at a machining geometry change point Pi coincides with the center of the edge tip angle of the multi-edge tool 40. Here, i represents an integer equal to or greater than 1, and $\theta_v$ represents a difference in angle (a clockwise direction) between the direction of the bisector (the center line direction of the workpiece) of the angle formed by the tool path C(i) and the tool path C(i+1) at the machining geometry change point Pi and the X-axis direction.

Further, when the angle between tool paths (blocks) is equal to or greater than 180 degrees, the edge direction determination unit 113 may determine, as the edge direction (the positioning angle of the edge indexing axis), an angle at which the direction perpendicular to the cutting surface of each of the tool paths (blocks) and the center line of the edge tip point of the multi-edge tool 40 coincide with each other.

Figure 8B:
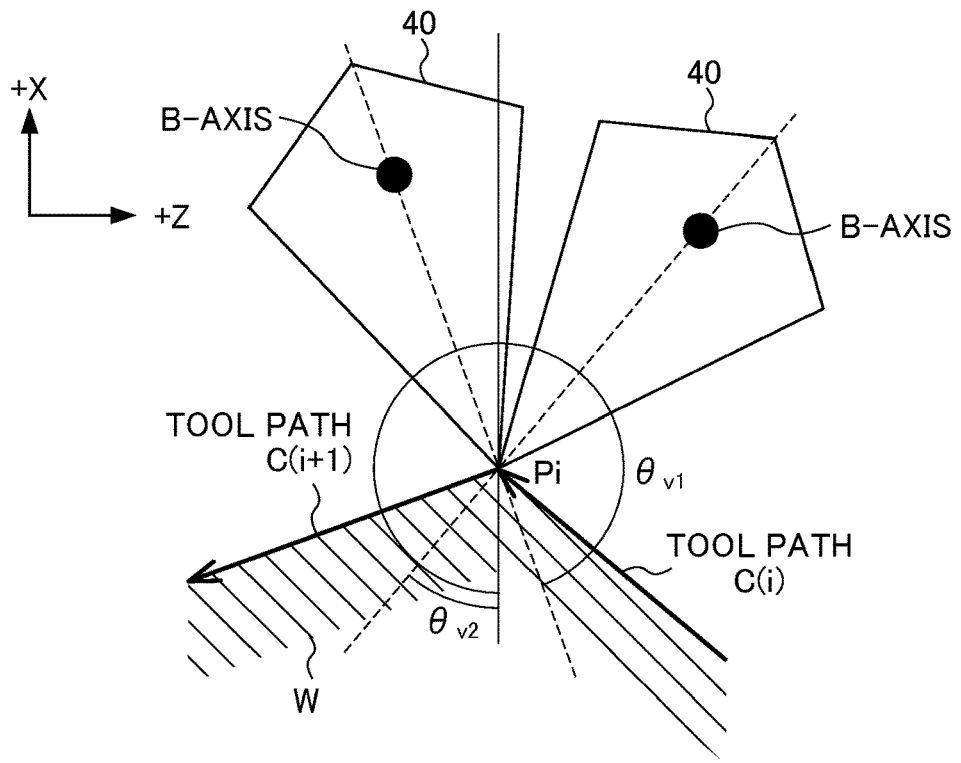
FIG. 8B is a diagram showing an example of a case where the angle between the tool paths is equal to or greater than 180 degrees.

FIG. 8B is a diagram showing an example of a case where the angle between the tool paths is equal to or greater than 180 degrees.

As shown in FIG. 8B, the edge direction determination unit 113 determines an edge direction such that the direction perpendicular (broken line) to the cutting surface of each of the tool paths C(i) and C(i+1) at the machining geometry change point P1 and the center line of the edge tip angle of the multi-edge tool 40 coincide with each other. Here, $\theta_{v1}$ and $\theta_{v2}$ represent a difference in angle (a clockwise direction) between the direction of the bisector (the center line direction of the workpiece) of the angle formed by the direction perpendicular (workpiece side) to the cutting surface of each of the tool paths C(i) and C(i+1) at the machining geometry change point P1 and the X-axis direction.

The method of determining the edge direction described above is merely an example, and it is considered that there are a method of specifying the angle of the center line of the edge tip point with respect to the direction perpendicular to the machining surface and a method of maintaining the edge direction determined once unless the interference determination unit determines that interference will occur, which will be described below.

<Interference Determination Unit 1131>

The interference determination unit 1131 determines, based on the tool geometry information, the machining geometry information, and the edge direction (positioning angle of the edge indexing axis) of each of the machining geometry change points determined by the edge direction determination unit 113, whether interference between the machining geometry and the multi-edge tool 40 occurs. When determining that the interference occurs, the interference determination unit 1131 changes the edge direction (positioning angle of the edge indexing axis) of the machining geometry change point, at which the interference occurs, in order to avoid the interference.

Figure 9A:
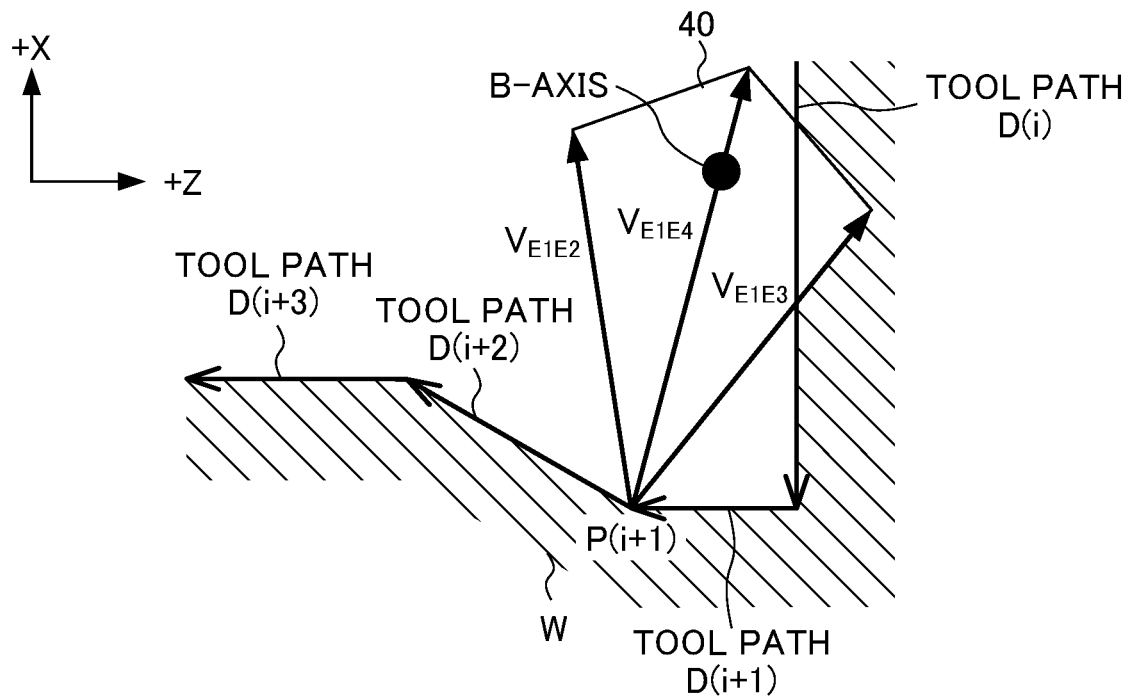
FIG. 9A is a diagram showing an example for illustrating an operation of an interference determination unit.
Figure 9B:
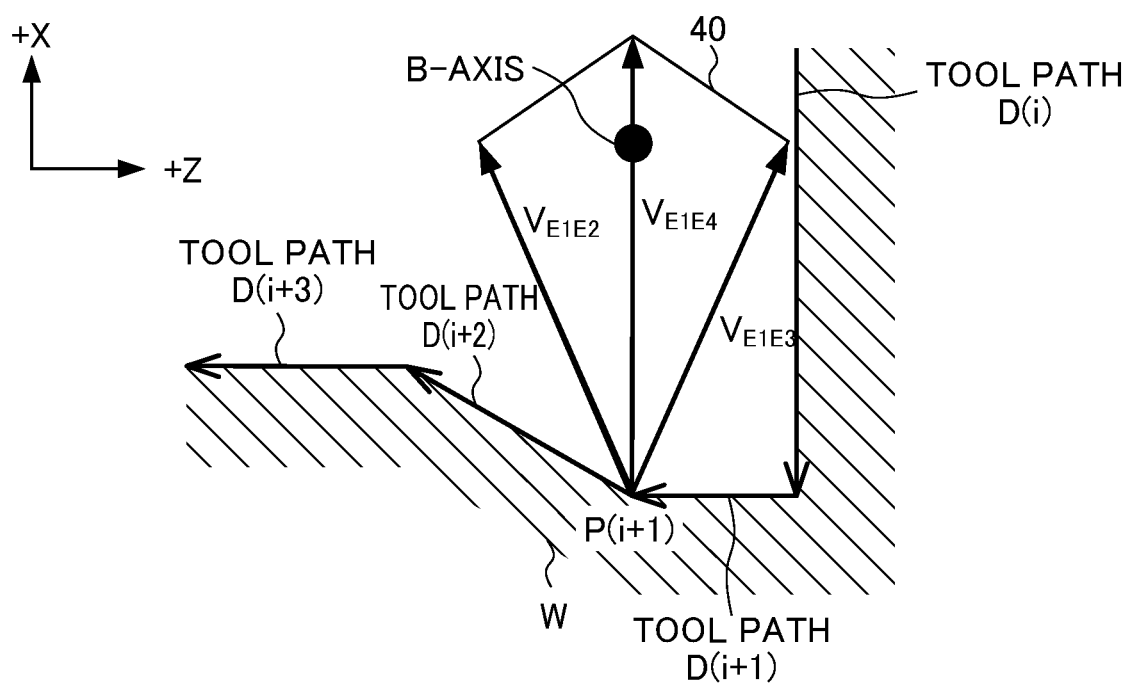
FIG. 9B is a diagram showing another example for illustrating the operation of the interference determination unit.

FIGS. 9A and 9B are diagrams showing an example for illustrating an operation of the interference determination unit 1131.

Specifically, as shown in FIG. 9A, the interference determination unit 1131 aligns the multi-edge tool 40 with the cutting surface of the workpiece W in the edge direction (positioning angle of the edge indexing axis) at each of the machining geometry change points, for example. The interference determination unit 1131 determines whether at least one selected from vectors $V_{E1E2}$, $V_{E1E3}$, and $V_{E1E4}$ in the tool geometry information from an edge tip of edge 1 (E1) to tips of edge 2 (E2), edge 3 (E3), and edge 4 (E4) intersects with any one of tool paths D(i) to D(i+3) in the machining geometry information. When at least one selected from the vectors $V_{E1E2}$, $V_{E1E3}$, and $V_{E1E4}$ intersects with any one of the tool paths D(i) to D(i+3), the interference determination unit 1131 determines that the machining geometry and the multi-edge tool 40 interfere with each other. In this case, as shown in FIG. 9B, the edge direction determination unit 113 may change the edge direction (positioning angle of the edge indexing axis) of the multi-edge tool 40 at the machining geometry change point P(i+1) in order to avoid the interference.

The method of determining the interference described above is merely an example, and it is considered that there is a method of determining the interference using detailed tool geometry information and machining geometry information created by a CAD (Computer Aided Design).

<Alarm Generation Unit 1132>

For example, when interference determination unit 1131 cannot avoid interference between the machining geometry and the multi-edge tool 40, the alarm generation unit 1132 generates an alarm and stops decoding and execution of the machining program 30. In this case, the generated alarm may be displayed on a display device (not shown) such as a liquid crystal display included in the numerical controller 10, or may be output with a sound through a speaker (not shown) included in the numerical controller 10.

Further, for example, when edge 4 is used for machining to which the non-machinable flag of the multi-edge tool shown in FIG. 3B is attached in the tool geometry information, the alarm generation unit 1132 may generate an alarm and stop decoding and execution of the machining program.

<Machining Control Unit 114>

The machining control unit 114 controls, based on the edge direction of the multi-edge tool 40 for each machining geometry change point, turning of the machine tool 20 while changing the edge direction of the multi-edge tool between the machining geometry change points according to interpolation processing, which will be described below, by the interpolation processing unit 120.

<Interpolation Processing Unit 120>

The interpolation processing unit 120 performs interpolation processing on the tool path received from the NC command decoding unit 110, and calculates a command position and a command speed. Further, the interpolation processing unit 120 interpolates the edge direction (positioning angle of the edge indexing axis) between the machining geometry change points, based on the edge direction (positioning angle of the edge indexing axis) of each of the machining geometry change points determined by the edge direction determination unit 113.

<Tool Offset Unit 130>

The tool offset unit 130 calculates a tool offset amount using the selected position offset amount and tool nose radius compensation amount of the multi-edge tool 40 and the tool geometry information of the multi-edge tool 40 generated by the tool geometry storage/generation unit 150.

<Pulse Distribution Unit 140>

The pulse distribution unit 140 outputs a pulse for each axis movement of the calculated tool offset to each servo motor (not shown) included in the machine tool 20.

<NC Command Execution Processing of Numerical Controller 10>

Next, a description will be given with respect to an example of an operation related to NC command execution processing of the numerical controller 10 in a case of performing cutting based on the machining program 30 for machining using the edges of the multi-edge tool 40.

Figure 10:
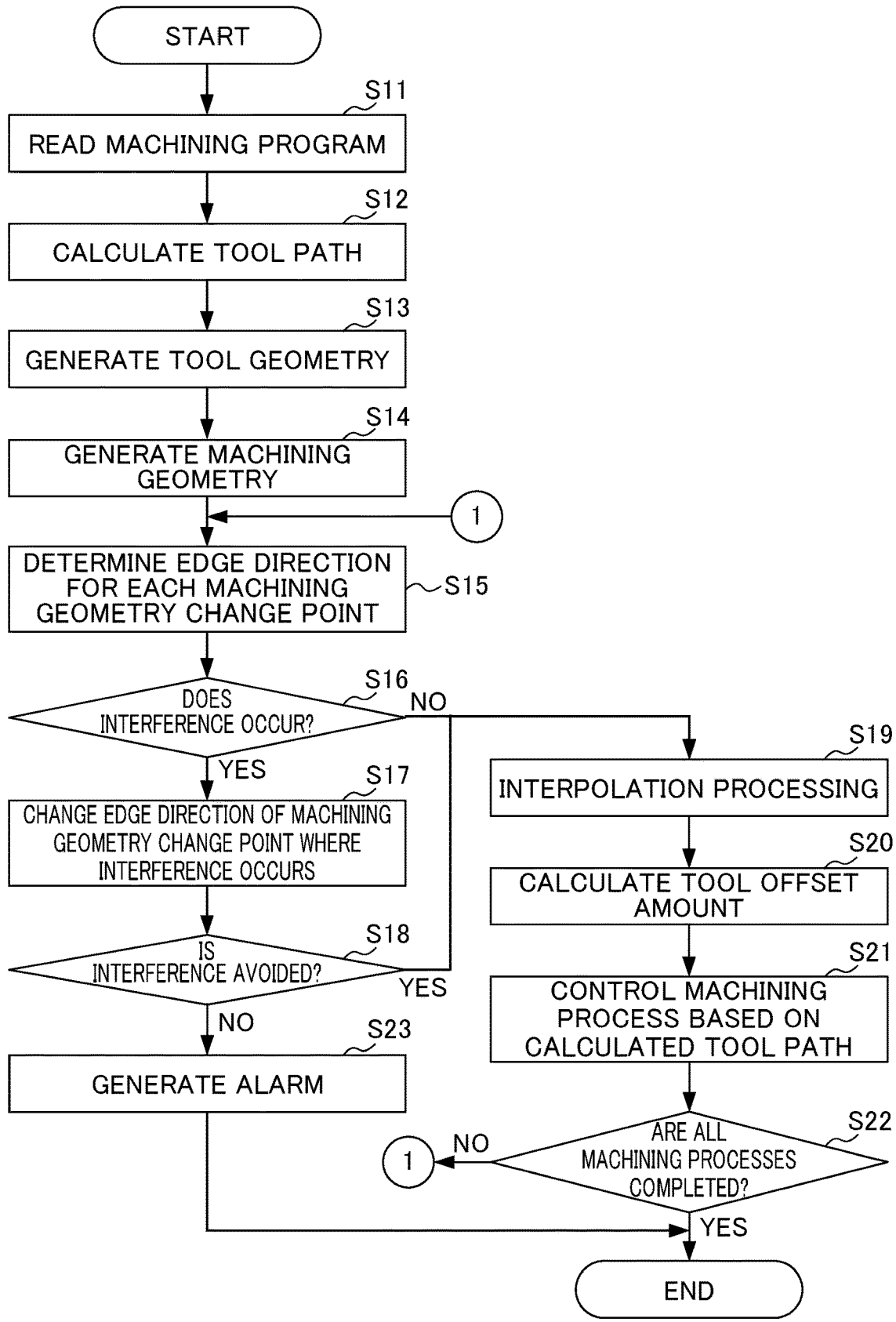
FIG. 10 is a flowchart illustrating an example of NC command execution processing of the numerical controller.
Figure 13:
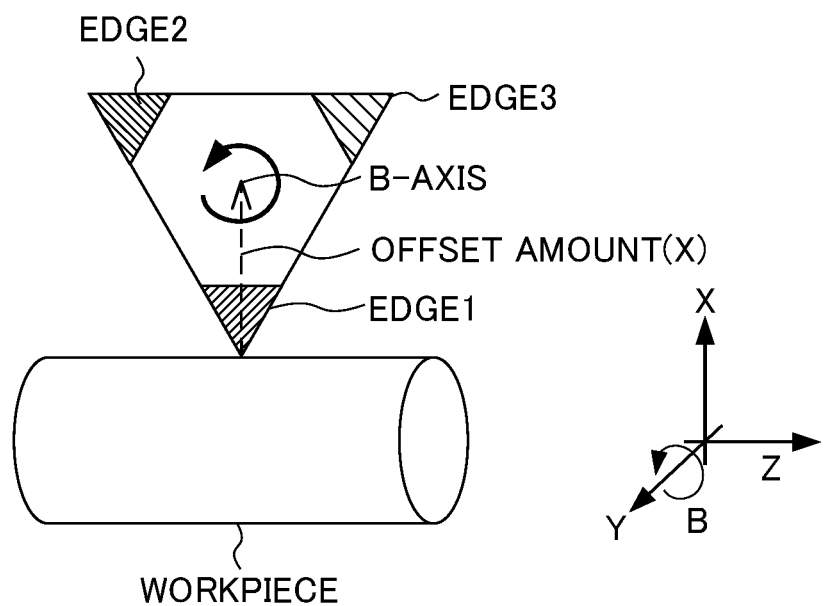
FIG. 13 is a diagram showing an example of a case where the multi-edge tool and the workpiece are aligned.
Figure 14:
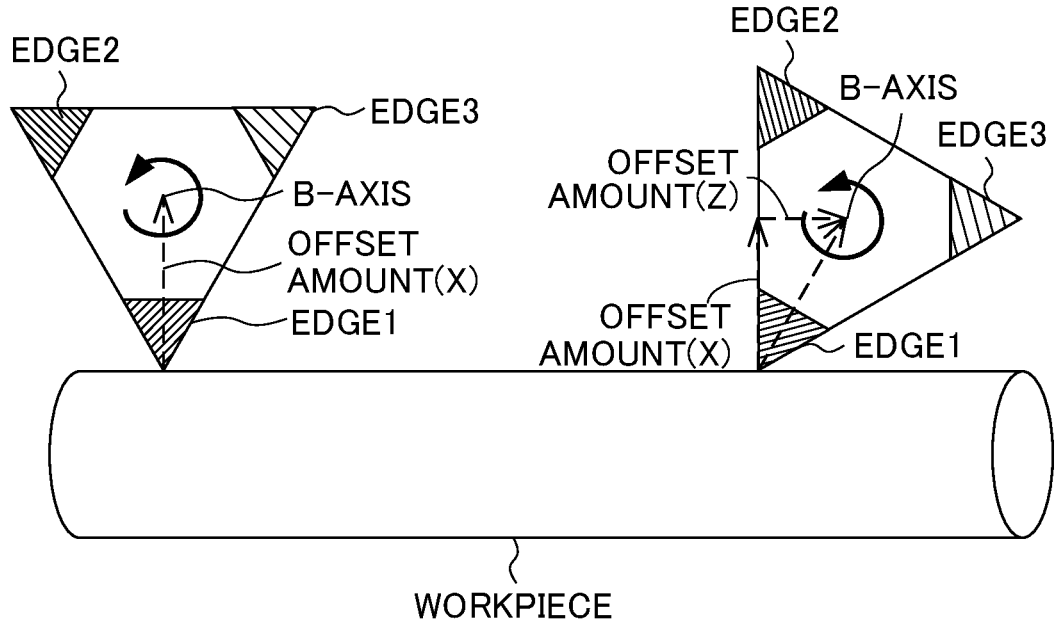
FIG. 14 is a diagram showing an example of a method disclosed in Patent Document 1.
Figure 15:
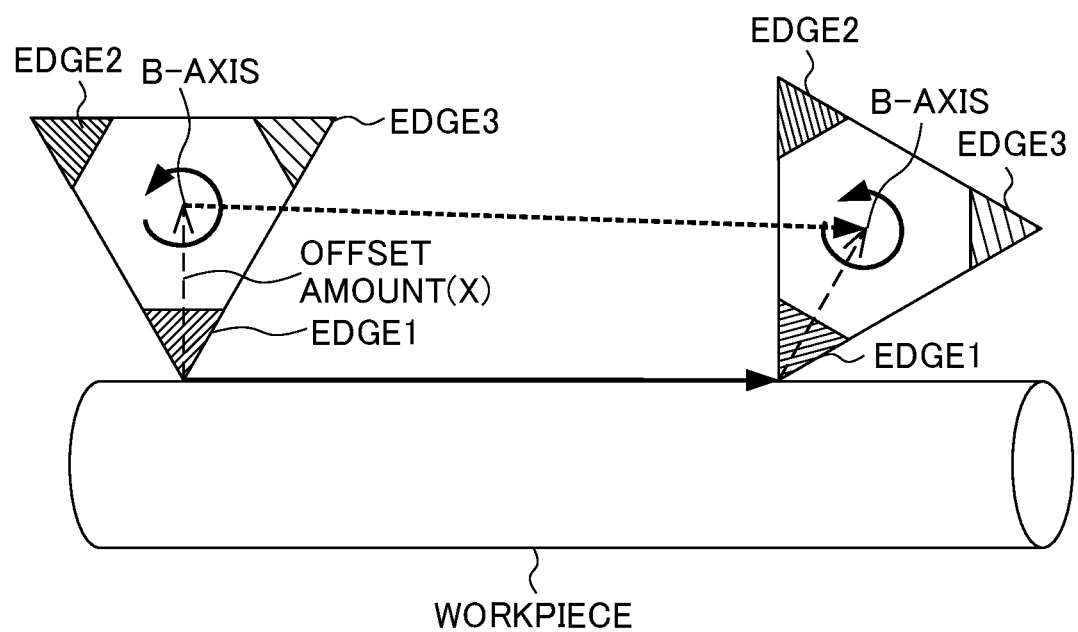
FIG. 15 is a diagram showing an example of a method disclosed in Patent Document 2.
Figure 16:
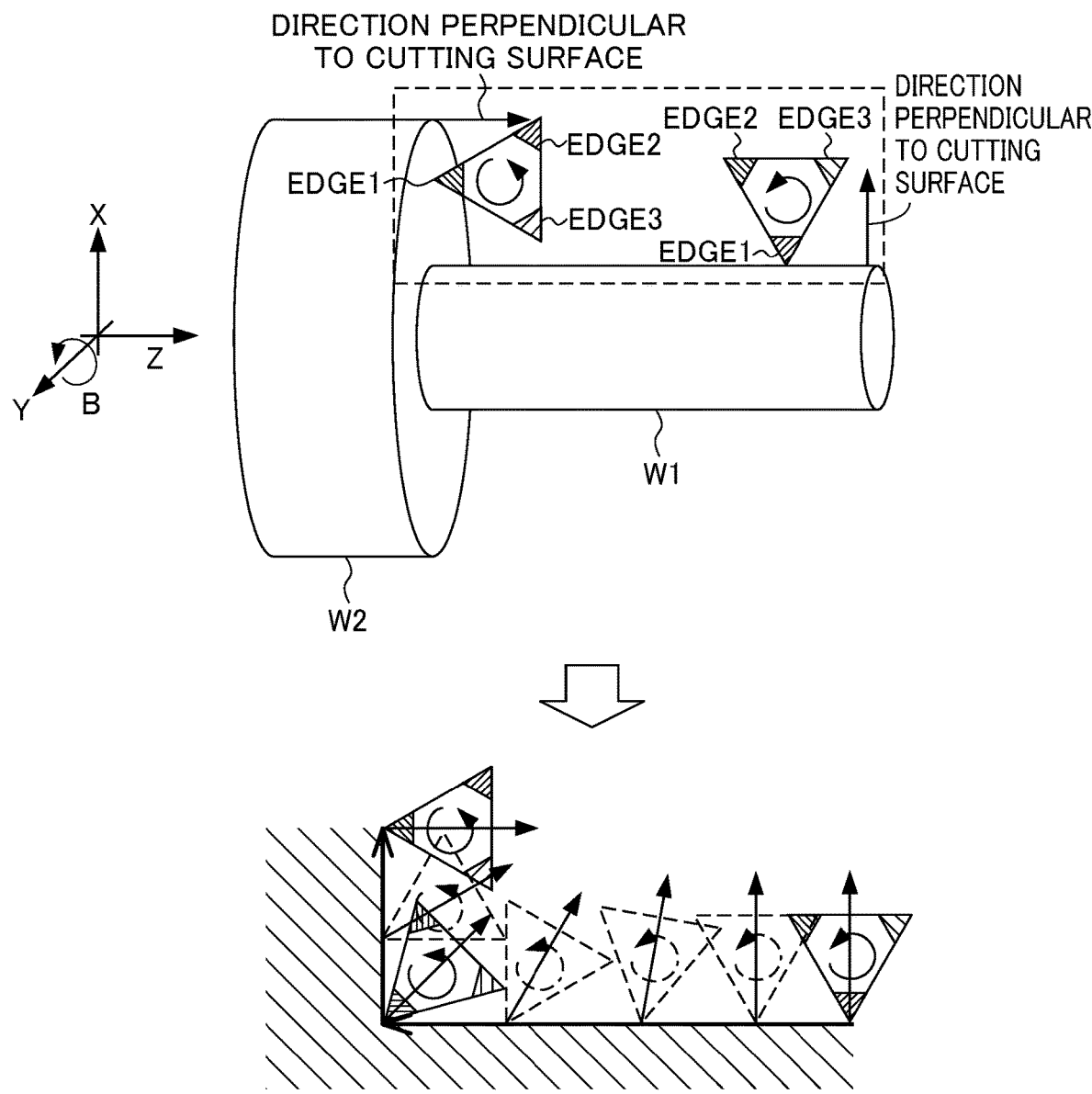
FIG. 16 is a diagram showing an example of cutting in which a direction perpendicular to a cutting surface on an XZ plane changes.

FIG. 10 is a flowchart illustrating an example of the NC command execution processing of the numerical controller 10.

In Step S11, the NC command decoding unit 110 reads the machining program 30.

In Step S12, the NC command decoding unit 110 pre-reads a plurality of blocks included in the machining program 30 read in Step S11, and calculates, for example, the tool path of the multi-edge tool 40 shown in FIG. 5B or 6B from the NC commands in the plurality of pre-read blocks.

In Step S13, the tool geometry storage/generation unit 150 generates and stores, based on the tool information data 210 registered in the tool information memory 200, the geometrical information related to the shape of the multi-edge tool 40 to be commanded by the machining program 30, as tool geometry information.

In Step S14, the machining geometry information generation unit 111 generates the machining geometry information related to the shape of the turning, based on the relative movement direction information, which is commanded by the machining program 30, between the multi-edge tool 40 and the workpiece W and the positional relationship information between the workpiece W and the multi-edge tool 40.

In Step S15, the edge direction determination unit 113 determines, based on the tool geometry information generated in Step S13 and the machining geometry information generated in Step S14, the edge direction of the multi-edge tool 40 for each machining geometry change point at which the machining geometry changes.

In Step S16, the interference determination unit 1131 determines, based on the tool geometry information generated in Step S13, the machining geometry information generated in Step S14, and the edge direction (positioning angle of the edge indexing axis) for each machining geometry change point determined in Step S15, whether the interference between machining geometry and the multi-edge tool 40 occurs. When the interference occurs, the process proceeds to Step S17. On the other hand, when no interference occurs, the process proceeds to Step S19.

In Step S17, the edge direction determination unit 113 changes the edge direction (positioning angle of the edge indexing axis) at the machining geometry change point at which it is determined in Step S16 that the interference occurs.

In Step S18, the alarm generation unit 1132 determines whether the interference can be avoided at the machining geometry change point. When the interference can be avoided at the machining geometry change point, the process proceeds to Step S19. On the other hand, when the interference cannot be avoided at the machining geometry change point, the process proceeds to Step S23.

In Step S19, the interpolation processing unit 120 performs the interpolation processing on the tool path received from the NC command decoding unit 110, calculates the command position and the command speed, and interpolates the edge direction (positioning angle of the edge indexing axis) between the machining geometry change points based on the edge direction (positioning angle of the edge indexing axis) of the machining geometry change point determined in Step S15.

In Step S20, the tool offset unit 130 calculates the tool offset amount using the selected position offset amount (for example, turning tool) and tool nose radius compensation amount of the multi-edge tool 40 and the tool geometry information generated in Step S13.

In Step S21, the machining control unit 114 controls the machining process based on the tool path calculated by the interpolation processing unit 120.

In Step S22, the machining control unit 114 determines whether all machining processes instructed by the machining program are completed. When all machining processes are completed, the NC command execution processing is ended. When all machining processes are not completed, the process proceeds to Step S15.

In Step 323, the alarm generation unit 1132 generates an alarm and stops decoding and execution of the machining program 30. Thereafter, the NC command execution processing is ended.

As described above, the numerical controller 10 determines the edge direction (positioning angle of the edge indexing axis) of the multi-edge tool 40 for each machining geometry change point, whereby it is possible to easily perform positioning of the edge indexing axis such that the selected edge always contacts with the cutting surface, while avoiding the interference between the workpiece and the tool.

Further, since the numerical controller 10 checks the interference between the cutting surface and the multi-edge tool 40 to automatically avoid the interference and generates the alarm and stops the operation when the interference cannot be avoided, complicated shapes can also be machined safely.

Further, when the multi-edge tool 40 for turning having a plurality of edges in one tool is used for machining, the numerical controller 10 controls the edge indexing axis (B-axis) such that the selected edge always contacts with the cutting surface according to the change in the direction perpendicular to the cutting surface. Thus, even when the machining geometry is complicated, the machining program 30 can be created without being conscious of the direction perpendicular to the cutting surface, and the machining program 30 can be easily created without using a CAM.

Further, since the numerical controller 10 does not need to determine the edge direction (positioning angle of the edge indexing axis) of the multi-edge tool 40 in the machining program 30, the machining geometry command part of the existing machining program can be reused.

The embodiment has been described above, but the numerical controller 10 is not limited to the above-described embodiment, and includes, for example, modifications and improvements within a range that can achieve the purpose.

Modification Example

In the above-described embodiment, the numerical controller 10 is the device different from the machine tool 20, but is not limited thereto. For example, the numerical controller 10 may be included in the machine tool 20.

Each of the functions included in the numerical controller 10 of the embodiment can be realized by hardware, software, or a combination thereof. Here, being realized by software means that such a function by the software is realized when a computer reads and executes a program.

The program may be stored and supplied to a computer using various types of non-transitory computer readable media. The non-transitory computer readable media include various types of tangible storage media. Examples of the non-transitory computer readable media include a magnetic recording medium (for example, a flexible disk, a magnetic tape, and a hard disk drive), a magneto-optic recording medium (for example, a magneto-optic disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM). Further, these programs may be supplied to computers using various types of transitory computer readable media. Examples of the transitory computer readable media include an electrical signal, an optical signal, and an electromagnetic wave. The transitory computer readable media can supply programs to a computer through a wired communication line, for example, electric wires and optical fibers, or a wireless communication line.

In addition, the steps of describing the program to be recorded on the recording medium include not only a process performed sequentially in a time-series manner but also a process executed in parallel or individually without being necessarily processed in a time-series manner.

In other words, the numerical controller and the control method of the present disclosure can take various embodiments having the following configurations.

(1) The numerical controller 10 of the present disclosure provides a numerical controller that controls a machine tool 20 for performing turning of a workpiece W using a multi-edge tool 40 for turning, the numerical controller including: a tool geometry information storage/generation unit 150 configured to generate and store, as tool geometry information, geometrical information related to a shape of the multi-edge tool 40; a machining geometry information generation unit 111 configured to generate machining geometry information related to a shape of the turning, based on relative movement direction information between the multi-edge tool 40 and the workpiece W to be commanded by a machining program 30 for the turning and positional relationship information between the multi-edge tool 40 and the workpiece W; an edge direction determination unit 113 configured to determine, based on the generated tool geometry information and the generated machining geometry information, an edge direction of the multi-edge tool 40 for each of machining geometry change points at which a machining geometry changes; and a machining control unit 114 configured to, based on the edge direction of the multi-edge tool 40 for each of the machining geometry change points, control the turning while changing the edge direction of the multi-edge tool 40 between the machining geometry change points.

According to the numerical controller 10, it is possible to easily perform positioning of the edge indexing axis such that the selected edge always contacts with the cutting surface, while avoiding the interference between the workpiece and the tool.

(2) In the numerical controller 10 according to (1) described above, the geometrical information may include at least an angle formed between edges in the multi-edge tool and a distance from a rotation center to an edge tip, and may be stored in a tool information memory 200 included in the numerical controller 10 in association with an edge number.

Thus, the numerical controller 10 can determine whether the interference between the machining geometry and the multi-edge tool 40 occurs.

(3) In the numerical controller 10 according to (1) or (2) described above, the tool geometry information storage/generation unit 150 may determine, based on the tool geometry information, an edge which is not usable for machining, among the edges of the multi-edge tool, and attach a non-machinable flag to the edge that is not usable for the machining, and the edge direction determination unit 113 may generate an alarm and stops decoding and execution of the machining program 30 when the edge to which the non-machinable flag is attached is used for the machining.

Thus, the numerical controller 10 can also safely perform machining of complicated shapes.

(4) In the numerical controller 10 according to any one of (1) to (3) described above, the positional relationship information between the multi-edge tool 40 and the workpiece W may specify whether the workpiece W is positioned on a right side or a left side in a movement direction of the multi-edge tool 40.

Thus, the numerical controller 10 can also safely perform machining of complicated shapes.

(5) In the numerical controller 10 according to any one of (1) to (4) described above, the edge direction determination unit 113 may determine the edge direction such that interference between the multi-edge tool 40 and the workpiece W does not occur, and generates an alarm to stop decoding and execution of a machining program when the interference is not avoidable.

Thus, the numerical controller 10 can also safely perform machining of complicated shapes.

(6) The control method of the present disclosure provides a control method for a machine tool 20 to be implemented by a computer, the machine tool 20 for performing turning of a workpiece W using a multi-edge tool 40 for turning, the control method including: generating and storing, as tool geometry information, geometrical information related to a shape of the multi-edge tool 40; generating machining geometry information related to a shape of the turning, based on relative movement direction information between the multi-edge tool 40 and the workpiece W to be commanded by a machining program 30 for the turning and positional relationship information between the multi-edge tool 40 and the workpiece W; determining, based on the generated tool geometry information and the generated machining geometry information, an edge direction of the multi-edge tool 40 for each of machining geometry change points at which a machining geometry changes; and controlling, based on the edge direction of the multi-edge tool 40 for each of the machining geometry change points, the turning while changing the edge direction of the multi-edge tool between the machining geometry change points.

According to the control method, the same effect as (1) can be obtained.

EXPLANATION OF REFERENCE NUMERALS 10 numerical controller
100 control unit
110 NC command decoding unit
111 machining geometry information generation unit
112 edge number command decoding unit
113 edge direction determination unit
1131 interference determination unit
1132 alarm generation unit
114 machining control unit
120 interpolation processing unit
130 tool offset unit
140 pulse distribution unit
150 tool geometry storage/generation unit
200 tool information memory
210 tool information data

The invention claimed is:

1. A numerical controller that controls a machine tool for performing turning of a workpiece using a multi-edge tool for turning, the numerical controller comprising:
a memory configured to store a program; and
a processor configured to execute the program and control the numerical controller to:
generate and store, as tool geometry information, geometrical information related to a shape of the multi-edge tool;
generate machining geometry information related to a shape of the turning, based on relative movement direction information between the multi-edge tool and the workpiece to be commanded by a machining program for the turning and positional relationship information between the multi-edge tool and the workpiece;
determine, based on the generated tool geometry information and the generated machining geometry information, an edge direction of the multi-edge tool for each of machining geometry change points at which a machining geometry changes; and
based on the edge direction of the multi-edge tool for each of the machining geometry change points, control the turning while changing the edge direction of the multi-edge tool between the machining geometry change points.

2. The numerical controller according to claim 1, wherein the tool geometry information includes at least an angle formed between edges in the multi-edge tool and a distance from a rotation center to an edge tip, and is stored in a storage unit included in the numerical controller in association with an edge number.

3. The numerical controller according to claim 1, wherein the processor determines, based on the tool geometry information, an edge which is not usable for machining, among the edges of the multi-edge tool, and attaches a non-machinable flag to the edge that is not usable for the machining, and
the processor generates an alarm and stops decoding and execution of the machining program when the edge to which the non-machinable flag is attached is used for the machining.

4. The numerical controller according to claim 1, wherein the positional relationship information between the multi-edge tool and the workpiece specifies whether the workpiece is positioned on a right side or a left side in a movement direction of the multi-edge tool.

5. The numerical controller according to claim 1, wherein the processor determines the edge direction such that interference between the multi-edge tool and the workpiece does not occur, and generates an alarm to stop decoding and execution of the machining program when the interference is not avoidable.

6. A control method for a machine tool to be implemented by a computer, the machine tool being for performing turning of a workpiece using a multi-edge tool for turning, the control method comprising:
generating and storing, as tool geometry information, geometrical information related to a shape of the multi-edge tool;
generating machining geometry information related to a shape of the turning, based on relative movement direction information between the multi-edge tool and the workpiece to be commanded by a machining program for the turning and positional relationship information between the multi-edge tool and the workpiece;
determining, based on the generated tool geometry information and the generated machining geometry information, an edge direction of the multi-edge tool for each of machining geometry change points at which a machining geometry changes; and
controlling, based on the edge direction of the multi-edge tool for each of the machining geometry change points, the turning while changing the edge direction of the multi-edge tool between the machining geometry change points.

* * * * *